Aug. 2, 1960

W. F. KING 2,947,172

BALANCING ORGANIZATION

Filed Nov. 17, 1954

INVENTOR
William F. King
BY
L. D. Burch
ATTORNEY

Aug. 2, 1960 W. F. KING 2,947,172
BALANCING ORGANIZATION
Filed Nov. 17, 1954 3 Sheets-Sheet 3

INVENTOR
William F. King
BY L. D. Busek
ATTORNEY

United States Patent Office 2,947,172
Patented Aug. 2, 1960

2,947,172

BALANCING ORGANIZATION

William F. King, Birmingham, Mich., assignor to General Motors Corporation, Detroit, Mich., a corporation of Delaware Filed Nov. 17, 1954, Ser. No. 469,365

9 Claims. (Cl. 73—462)

This invention relates to dynamic balancing installations of a type particularly adapted for effecting automatic unbalance determinations and balance corrections in elongated rotating workpieces such as crankshafts and the like. The invention is an improvement over copending applications S.N. 469,893, Automatic Balancing Installation, filed November 19, 1954, and S.N. 684,248, filed September 16, 1957, which is a continuation of S.N. 458,172 (now abandoned), Balancing Organization, filed September 24, 1954. It is specially suited for use in engine assembly or finish balancing installations in which the crankshaft is automatically checked for unbalance when installed in an engine and any unbalance in the shaft, as well as such unbalance as may be contributed thereto by the other components of the engine associated with the shaft, automatically corrected in the assembled condition of the engine.

The invention has among its general objects to provide such apparatus in accordance with the above which is characterized by extreme simplicity of construction and of operation and, yet, is possessed of sufficient sensitivity and accuracy required for high production balancing installations. Other objects are to provide automatically operated unbalance determining apparatus which is adapted to be intimately associated with unbalance correcting apparatus that is automatically adjusted during the determination of the characteristics of unbalance on a workpiece for effecting subsequent balance corrections thereto with a minimum of or absence of human intervention.

The above and other objects, together with the features and advantages attending the present invention will appear more fully from the following detailed description and drawings, wherein.

Figure 1:
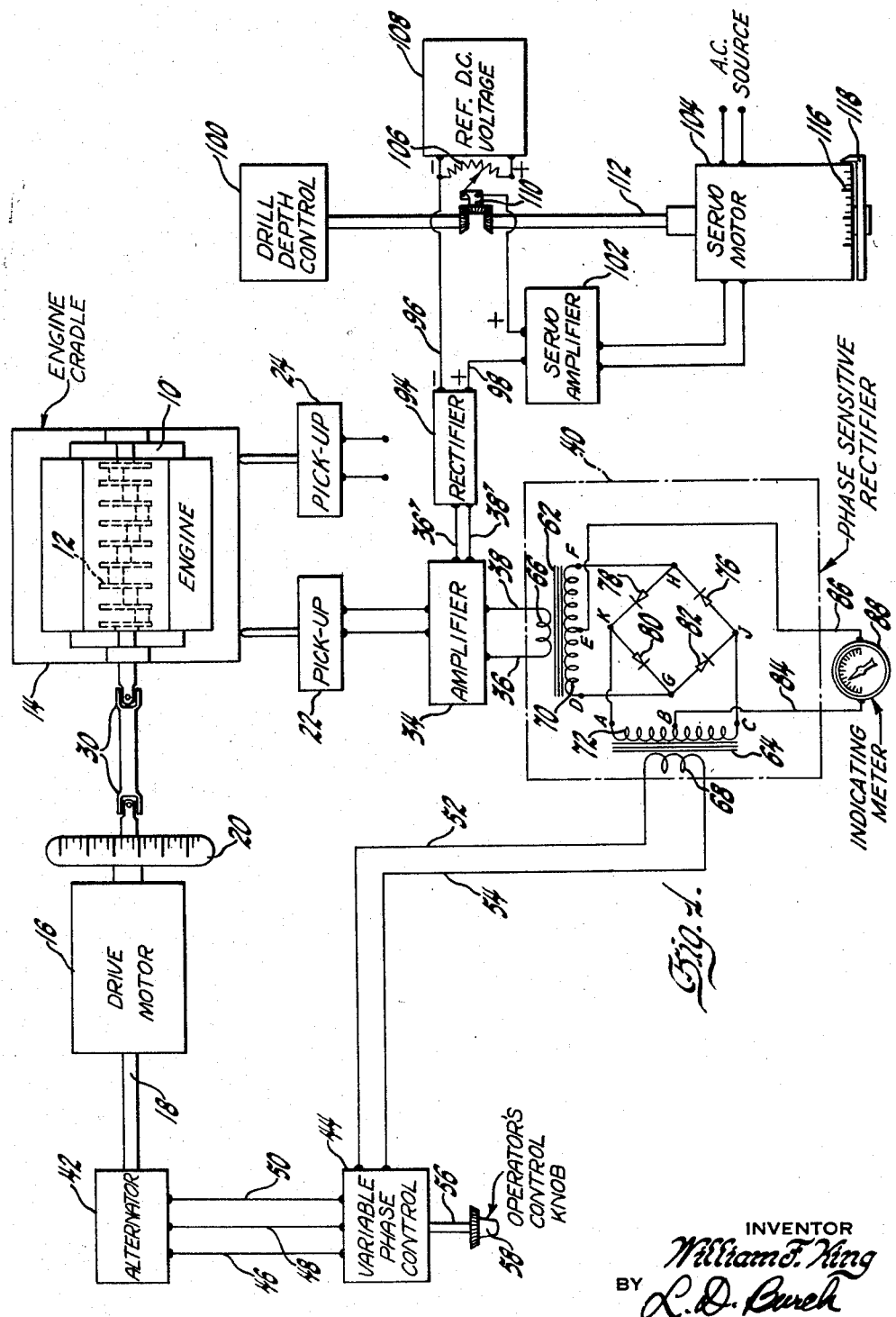
Fig. 1 is a schematic and block diagrammatic showing of one form of dynamic balancing installation in accordance with the present invention.

In the drawings, 10 is an engine assembly shown as having a crankshaft 12 therein and mounted with the oil pan cover removed in an oscillatable engine stand or cradle 14. 16 is a constant speed electric drive motor, the shaft 18 of which mounts an angularly graduated hand wheel 20 thereon and is suitably coupled to the engine crankshaft 12 to rotate the latter on its axis in the cradle or stand. 22 and 24 are vibration pickups each of which is associated with an unbalance magnitude and location determining apparatus and an element of an unbalance magnitude correcting device in accordance with the present invention. Only one set of the unbalance determining apparatus and the element of an unbalance magnitude correcting device for one of the pickups is shown in the drawings, which are for the most part of a diagrammatic nature to bring out principles of operation rather than particular details of construction.

The engine stand or cradle 14 is of a type employed in conventional balancing installations and is mounted on resilient or oscillatable supports that permit movement of the cradle and engine due to unbalance effects in either end of the crankshaft in an axial plane of the shaft and the vibration pickups. In accordance with conventional balancing practice, the crankshaft is coupled to the shaft 18 of the drive motor through a suitable coupling arrangement shown at 30, which may comprise a pair of spaced universal joints that permit free oscillation of the shaft under the influence of unbalance forces therein.

The vibration pickups 22 and 24 are mounted transversely to the axis of the shaft and at axially spaced points along the length of the cradle corresponding to the mechanical nodal points of the unbalance forces at the respective ends of the crankshaft in accordance with the theory and practice set out in United States Patent 2,293,371 in the name of T. C. Van Degrift assigned to the present assignee. The pickups are conventional electromagnetic devices each of which generates an alternating current signal proportional to the velocity of the oscillatory vibrations appearing at the respective ones of the aforementioned nodal points, and, by reason of the nodal point mounting thereof, are unaffected by the unbalance influence of the opposite end of the shaft. The alternating current signal from each of the pickup devices has a frequency equal to the rotational speed at which the crankshaft is driven and an amplitude proportional to the total unbalance effect produced by the end of the shaft adjacent the pickup. Each pickup signal further includes a phase displacement characteristic that is related to the angular location of the total unbalance from a fixed reference point on the surface of the shaft and contained in a transaxial correction plane extending through an end counterweight of the shaft, there being two such correction planes, one at each end of the shaft.

Pickup 22, together with the apparatus associated therewith, is adapted, therefore, to sense the characteristics of unbalance at the left end of the shaft and has its output amplified in an amplifier 34 the output of which is applied over conductors 36, 38 to one of the two sets of input terminals of a phase sensitive rectifier device 40 the other set of input terminals of which is energized from a small alternator 42 through a variable phase shifting or control device 44. The alternator may be a two or three phase generator of either the wound rotor or permanent magnet rotor variety, with the rotor coupled to the shaft 18 of the drive motor 16 and driven in synchronism with the crankshaft. The phase control device 44 may be a Selsyn or Autosyn synchro, Circuitrol or equivalent phase shifting device the exact form of which will depend somewhat on the form of the alternator.

Using a permanent magnet generator for the alternator, for example, the phase shifting device 44 could be a synchro device, the polyphase stator winding of which is connected to the polyphase stator winding of the alternator over conductors 46, 48 and 50 so as to develop a single phase alternating current output across the two wire, rotor terminals thereof shown connected to the phase sensitive rectifier over conductors 52 and 54. The rotor shaft of the phase shifting device is shown at 56 and mounts an angularly graduated control knob 58 thereon which may be adjusted by the operator to vary the phase angle of the alternating current signal translated thereby and applied to one of the inputs of the phase sensitive rectifier 40.

The phase sensitive rectifier 40 together with the alternator 42 and variable phase control device 44 constitute a phase sensitive switching or electronic commutator circuit by means of which the phase angle of the unbalance pickup signal may be accurately determined to ascertain the angular location of the unbalance force at one end of the crankshaft. The rectifier circuit is a form of a ring or bridge circuit and includes a pair of input transformers 62 and 64 having primary windings 66 and 68 and center-tapped secondary windings 70, 72, respectively. The primary winding 66 of transformer 62 is connected to conductors 36, 38 to receive the amplified unbalance pickup signal, while primary 68 of transformer 64 is connected to conductors 52 and 54 to receive the variable phase signal from the phase translating device 44. The end terminals A, C of the secondary 72 of transformer 64 are connected to the diagonal terminals J, K of an arrangement of dry type rectifiers 76, 78, 80 and 82 serially connected to form the bridge circuit proper with each of the rectifiers forming an arm of the bridge. The end terminals D, F of the secondary 70 of the unbalance signal transformer 62 are connected to the conjugate terminals G, H of the rectifier bridge proper. The secondary taps indicated at B and E of the transformer secondaries 72 and 70, respectively, are connected over conductors 84 and 86 to a zero center D.C. milliammeter 88 constituting the output of the phase sensitive circuit, the operation of which is explained below.

During one half cycle of the variable phase signal voltage, the secondary terminal A of the transformer 64 will be, say, of negative polarity and terminal C will be positive. Rectifiers 80 and 82 will not conduct with this polarity and will act like an open circuit. However, current will flow through the rectifiers 76 and 78 which will act as resistances and will present equal resistance if matched rectifiers are used. Since terminal B is a center tap on the transformer 64 and bridge point H is between two equal resistances across this transformer, points B and H are of equal potential. Any voltage introduced between these points, as by the unbalance signal transformer 62, will cause current to flow in the output of the bridge. Thus, the output load constituted by the meter 88 is effectively connected across the terminals E and F with the internal impedance of the variable phase signal rectifier circuit connected in series therewith.

During the next half cycle of the variable phase signal voltage, the output load will be connected across the unbalance signal transformer terminals D and E by the rectifiers 80 and 82 in the same manner.

It will thus appear that if the unbalance pickup signal is 90 degrees out of phase with the variable phase signal, the output of the phase sensitive rectifier circuit 40 will be zero. By adjusting the phase of the variable phase signal with the aid of the variable phase control device 44, a quadrature relationship may be obtained between the reference or variable phase signal and the unbalance amplitude signal so as to obtain a null or a zero reading on the indicating meter. Accordingly, the angular displacement of the control knob 58 to effect the null reading on the meter 88 will be equal to the phase angle of the unbalance pickup signal and to the angular location of the unbalance relative to a fixed point on the surface of an end of the shaft.

The amplitude or magnitude of the total unbalance at the left end of the shaft is determined by applying the amplified pickup signal appearing at the output terminals 36', 38' of amplifier 34 directly to a rectifier 94 the output of which is applied over conductors 96, 98 to a closed loop servo controlled amplitude comparison circuit. This circuit automatically indicates the magnitude of the unbalance quantity and positions an adjustable drill stop setting element 100 of a balance correction drilling organization associated with the unbalance determining apparatus to effect exact compensation for the amount of the unbalance at the left end of the crankshaft.

The amplitude comparison and drill stop positioning apparatus includes a conventional servo amplifier 102 and its associated two phase servo motor 104 and a potentiometer arrangement comprising an adjustable resistor 106 connected across a fixed known reference source of voltage 108, which may be a battery. The output of the rectifier 94 is connected in series with the input of the servo amplifier and the portion of the output of the potentiometer appearing between conductor 96 and the adjustable arm 110 of the potentiometer resistor 106 which is mechanically coupled to the shaft 112 of the servo drill stop positioning motor 104.

One of the phase windings of the servo motor 104 is connected for energization from a local alternating current source of supply and the other quadrature phase winding thereof is connected for energization by a control signal, which appears at the output of the servo amplifier 102 and corresponds to the amplitude difference between the output of the rectifier 94 and the potentiometer. The resulting differential control signal is of such magnitude and polarity as to tend to rotate the servo motor in a direction and an amount such as to reduce the error or control signal to zero, at which point the comparison system will be balanced and the motor or translating device will cease moving.

An indicating arrangement in the form of a graduated indicator dial 116, which may be provided on, say, the stator casing of the servo motor 104, and a pointer 118 carried by the rotor shaft 112 thereof may be employed to indicate the magnitude of the unbalance. The shaft 112 of the servo motor is directly coupled to the drill depth control element 100 of a balance correcting drilling organization or equivalent balance correcting apparatus, which is mounted under the engine assembly, and adjusts the drill depth setting element automatically in accordance with the magnitude of unbalance. It will be noted that both the unbalance magnitude determination and the setting of the drill stop element are performed completely automatically without human intervention.

After the angular location of the unbalance has been read by the operator from the control knob 58 of the phase translating device 44 and the drill depth stop has been automatically adjusted by the servo motor of the self-balancing amplitude comparison circuit, the operator manually adjusts the hand wheel 20 to position the exposed counterweight at the left end of the crankshaft over the drill bit of the drilling organization mounted below the engine stand, and thereafter energizes the drill motor and transmission apparatus thereof to remove an amount of metal corresponding to the setting of the drill stop element from the counterweight in the left end correction plane. The operation is repeated for the right end of the shaft.

Pickup 24 is adapted to sense unbalance effects in the right end of the crankshaft and will have its output applied to an unbalance determining and drill depth setting apparatus including a second phase sensitive rectifier, alternator and phase translating device and to an amplitude comparison circuit similar to that associated with pickup 22, the complete illustration of which has been omitted for simplicity of the drawing.

For greater sensitivity, particularly where small unbalance magnitude determinations and corrections are sought to be effected, a second phase sensitive rectifier 140 can be employed for the unbalance magnitude determining portion of the unbalance determining apparatus of Fig. 1 in order to avoid the masking effect of harmonics and spurious vibrations of the engine that may effect the magnitude of the fundamental component of the unbalance magnitude force detected by the pickups. The phase sensitive rectifier acts as a highly selective, narrow band pass filter which rejects components of all frequencies other than the fundamental or rotational frequency component of the signal developed by the pickup.

Figure 2:
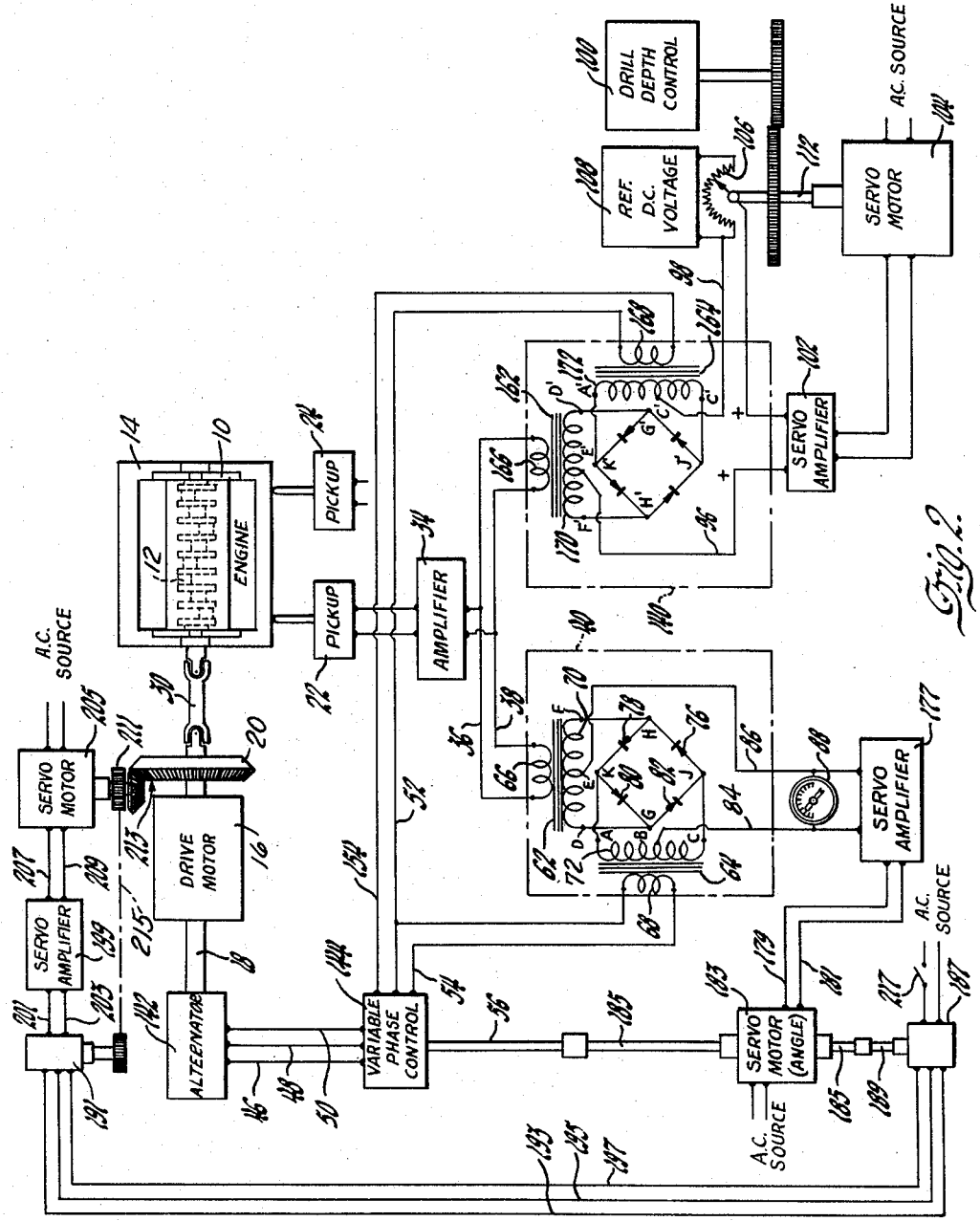
Fig. 2 is another form of dynamic balancing installation in accordance with the present invention.

Such an arrangement of two phase sensitive rectifiers for unbalance magnitude and angle resolution of the output of each pickup is shown in Fig. 2, bearing like reference numeral designations for like parts employed in Fig. 1. In this case, the alternator 142 and the variable phase control device 144 may be two-phase devices with the two phase rotor winding of the phase control device being 90 degrees out of phase with each other and connected over conductors 52, 54 to the variable phase input winding 68 of the unbalance angle phase sensitive rectifier 40 and over conductors 52, 154 to the variable phase input winding 168 of unbalance magnitude phase sensitive rectifier device 140, the other input winding 166 of which is connected to conductors 36, 38 to receive the amplified output of pickup 22. The output of the second phase sensitive rectifier device 140 is taken over conductors 96 and 98 connected, respectively, from the centertaps of windings 172 and 170 to the low potential side of the amplified comparison balancing potentiometer 106 and to one of the input terminals of the servo amplifier 102, respectively, as shown.

As a further refinement, the output of the first or unbalance angle phase sensitive rectifier 40 is applied to the input of a servo amplifier 177 of a servo positioning system for automatically adjusting the variable phase control device 144, thereby dispensing with this previously manually performed operation. The output of the servo amplifier 177 is connected over conductors 179 and 181 to the variably energized phase windings of a servo motor 183 whose rotor shaft 185 is coupled to the rotor shaft 56 of the phase control device 144.

The embodiment of Fig. 2 may further include still another servo positioning arrangement for angularly positioning the handwheel 20 upon conclusion of the unbalance determining operation to correspond to the extent of rotation of the unbalance angle servo motor 183 when the phase sensitive rectifier was adjusted to balance, and thereby to locate the crankshaft in proper relation to the balance correcting apparatus. This last-mentioned crankshaft positioning arrangement may include a synchro transmitter device 187, the rotor shaft 189 of which is coupled to the shaft 185 of the phase control positioning servo motor 183; a synchro receiver or control transformed device 191 the three-phase stator winding of which is electrically connected to the three-phase stator winding of the transmitter device 187 over conductors 193, 195, 197, the rotor of this synchro device being geared or otherwise connected to rotate in synchronism with the engine, as by gearing with unity ratio to shaft 18; a servo-amplifier 199 the input terminals of which are connected to the rotor winding of the receiver synchro device 191 over conductors 201 and 203; and a two-phase power servo positioning motor 205 the control phase winding of which is connected to the output of the servo amplifier 199 over conductors 207 and 209. The other winding of the servo motor 205 is energized from a local alternating current power source. The rotor shaft 211 of this servo positioning motor is coupled through suitable gearing 213 to the wheel 20 or to the drive motor shaft 18, and through unity gearing indicated by the dashed line 215 to the rotor shaft of the control transformer 191 in the manner of synchro-controlled servo positioning arrangements. A switch 217 may be provided in one of the A.C source conductors of the position transmitter device and is adapted to be closed to energize this data transmission system at the conclusion of the unbalance determining cycle when the drive motor 16 stops rotating at which time the control phase winding of the servo motor 205 will be energized to servo position the wheel 20 in accordance with the determined angle of unbalance location.

Figure 3:
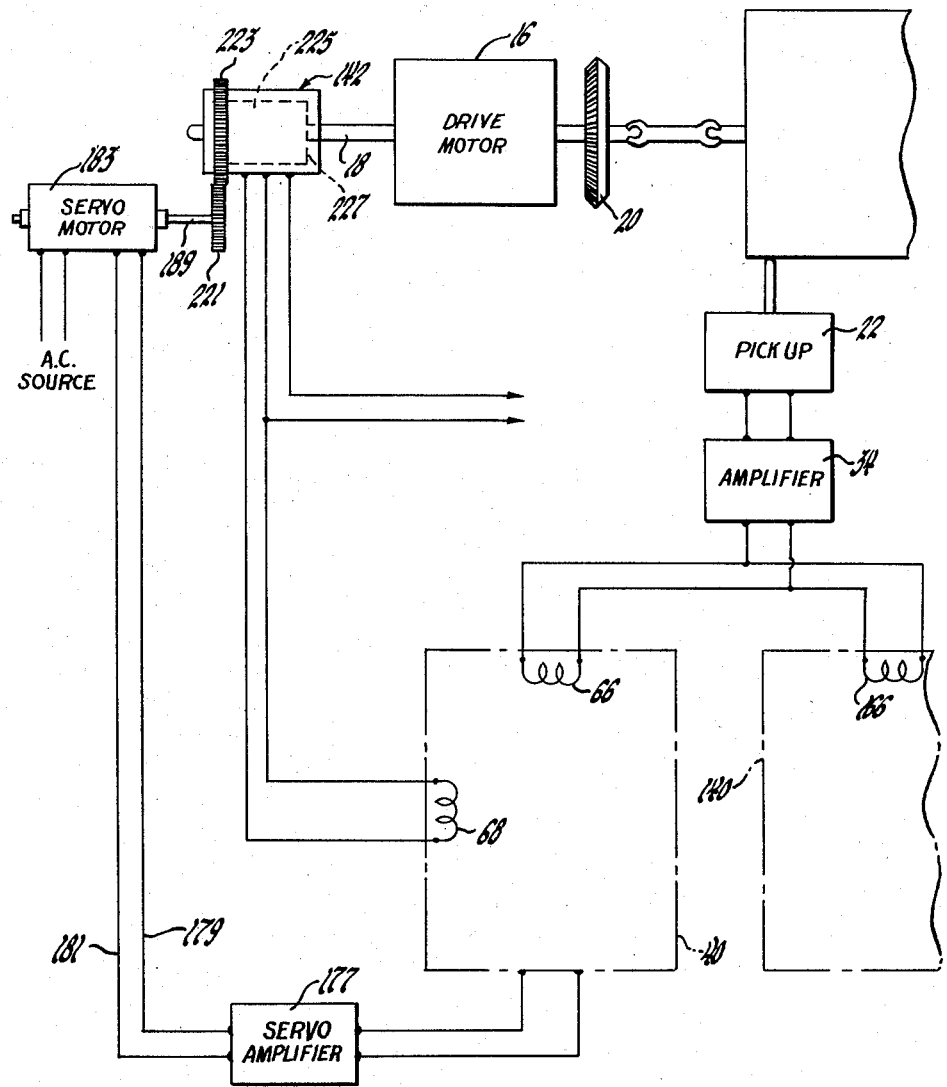
Fig. 3 is a modification of a part of the apparatus of Fig. 2.

Fig. 3 illustrates a variation by means of which the variable phase control device 44 and 144 of Figs. 1 and 2 may be eliminated and comprehends using the unbalance angle servo motor 183 for repositioning the stator casing of the reference alternator device 142 relative to its rotor so that the individual phase outputs thereof will be in phase quadrature with the amplified unbalance pickup signal applied to the input windings 66 and 166, respectively, of the phase sensitive rectifier devices 40 and 140. In this embodiment, the unbalance angle servo motor 183 has its shaft 189 coupled through gear 221 to a gear 223 on the stator casing 225 of the reference alternator 142 whose rotor 227 is coupled to the shaft 18 of the drive motor. Reference is made to copending patent application Serial No. 456,089, filed September 15, 1954, in the name of the present inventor, for additional details of a suitable manner of mounting, energizing and coupling of the reference alternator device that may be employed herein. Servo positioning of the wheel 20 can be accomplished with the apparatus of Fig. 3 by the data transfer and power follow-up arrangement discussed in connection with Fig. 2.

While the present invention has been shown and described herein as applied to the unbalance detection and correction of unbalance in two arbitrarily selected transaxial planes of correction in elongated bodies such as crankshafts, it is apparent that the principles and apparatus of the present invention are equally adapted to automatic detection and correction of unbalance in bodies in which the unbalance is located in but a single transaxial plane.

What is claimed is:

1. Apparatus for determining the location and magnitude of unbalance of a rotatable body comprising in combination; vibratile means supporting the body for rotation about its rotational axis; drive means including a shaft coupled to said body for rotating it about its rotational axis; vibration pickup means responsive to vibrations induced in said vibratile supporting means by unbalance in said body and developing a periodically varying electrical signal having characteristics related to the magnitude and the location of unbalance in said body; means for determining the location of unbalance in said body including a two phase alternator driven by said rotating drive means in synchronism with said body and having a pair of quadrature related phase windings generating a pair of quadrature related alternating current reference signals, adjustable phase shifting means for shifting the phase of the reference signals from said alternator relative to said rotatable body, a phase sensitive rectifier bridge having two pairs of input terminals and one pair of output terminals, one of the said pairs of input terminals of said phase sensitive rectifier bridge being connected to said vibration pickup means and the other input pair being operatively interconnected with said alternator to receive one of said reference signals, and null indicating means connected to said output terminals of said bridge; means for determining the magnitude of unbalance in said body including a second phase sensitive rectifier bridge having one pair of input terminals connected to said vibration pickup means and another pair of input terminals operatively connected to said alternator to receive the other of said reference signals, and amplitude measuring means connected to the output terminals of said second phase sensitive rectifier bridge; a continuous proportional servo positioning system including a servo motor having a control winding energized from the output of said first phase sensitive rectifier bridge, said system including a rotor coupled to said adjustable phase shifting means for adjusting said phase shifting means until the output of said phase sensitive bridge is null; and an electrical follow-up means positioned by said servo motor and coupled to the shaft of said drive means for positioning said shaft and said body in accordance with the location of unbalance therein, and switch means adapted to be closed to energize said follow-up means upon completion of the unbalance determining cycle and cessation of operation of said drive means.

2. Apparatus in accordance with claim 1 wherein said amplitude measuring means comprises a continuous proportional self-balancing amplitude comparison circuit.

3. Apparatus in accordance with claim 2 wherein said amplitude comparison circuit includes an adjustable source of potential, a servo amplifier having a pair of input terminals and a pair of output terminals with the input terminals connected to receive the difference signal between the output of said second-mentioned phase sensitive rectifier bridge and said adjustable source of potential, and a servo motor having a control winding connected to the output terminals of said servo amplifier and a rotor coupled to adjust said adjustable source of balancing potential to reduce said difference signal to zero.

4. Apparatus in accordance with claim 3 including an adjustable stop element of an unbalance correcting device positioned by said second-mentioned servo motor in the course of balancing said amplitude comparison circuit.

5. Apparatus for determining the location of unbalance of a dynamically unbalanced body comprising in combination, vibratile means supporting the body for rotation about its axis, drive means including a rotatable shaft coupled to said body for rotating the latter on its axis, vibration pickup means responsive to vibrations induced in said vibratile supporting means by unbalance in said body and developing a periodically varying signal having characteristics related to the location of unbalance in said body, means driven by said drive means in synchronism with said body and generating an alternating current reference signal, adjustable phase shifting means connected to said generating means for shifting the phase of the reference signal generated thereby, a phase sensitive rectifier bridge having two pairs of input terminals and one pair of output terminals, one of the said pairs of input terminals being connected to said vibration pickup means and the other to said adjustable phase shifting means, and a continuous proportional servo positioning system including a servo amplifier having a pair of input terminals and a pair of output terminals with its input terminals connected to the output terminals of said bridge, and a servo motor having a control winding connected to the output terminals of said amplifier and a rotor mechanically coupled to said adjustable phase shifting means to adjust the phase of the reference signal relative to the vibration pickup signal and reduce the output of said bridge to zero, electrical follow-up means controlled by said servo motor and coupled to said shaft of said drive means for positioning said shaft and said body in accordance with the location of unbalance therein, and switch means controlling the energization of said follow-up means and adapted to be closed to complete an energizing circuit therefor upon completion of the unbalance determining cycle and cessation of operation of said drive means.

6. Apparatus for determining the location of unbalance of a dynamically unbalanced body comprising in combination, vibratile means supporting the body for rotation about its axis, drive means including a rotatable shaft coupled to said body for rotating the latter on its axis, vibration pickup means responsive to vibrations induced in said vibratile supporting means by unbalance in said body and developing a periodically varying signal having characteristics related to the location of unbalance in said body, means driven by said drive means in synchronism with said body and generating an alternating current reference signal, adjustable phase shifting means connected to said generating means for shifting the phase of the reference signal generated thereby, a phase sensitive rectifier bridge having two pairs of input terminals and one pair of output terminals, one of the said pairs of input terminals being connected to said vibration pickup means and the other to said adjustable phase shifting means, and a continuous proportional servo positioning system including a servo amplifier having a pair of input terminals and a pair of output terminals with its input terminals connected to the output terminals of said bridge, and a servo motor having a control winding connected to the output terminals of said amplifier and a rotor mechanically coupled to said adjustable phase shifting means to adjust the phase of the reference signal relative to the vibration pickup signal and reduce the output of said bridge to zero, a data transmission system having a transmitter element coupled to the rotor of said servo motor and a receiver element, and a power follow-up servo system including a second servo motor having a control winding energized from said receiver element and a rotor coupled to said shaft of said drive means, and means energizing said data transfer system when said drive means stops rotating.

7. Unbalance measuring apparatus for measuring the unbalance in a rotating workpiece comprising means having a pair of rectifier circuits, each of said circuits having a first inductive input comprising the primary of a transformer and a second input comprising the primary of a second transformer, a vibration pickup for creating an unbalance signal indicative of the unbalance in said workpiece, said vibration pickup being interconnected with the pair of first inputs to said rectifier circuits, an alternator driven in synchronism with said workpiece to produce a pair of reference signals ninety degrees out of phase with each other, phase shifting means interconnecting said alternator with the pair of second inputs to said rectifier circuits, said circuits being responsive to said reference signals to rectify said unbalance signal and produce a pair of output signals, a positioning servo mechanism including a servo amplifier having an input connected to the output of one of said rectifier circuits and including a servo motor having a control winding connected to the output of said amplifier, said servo motor being mechanically interconnected with said phase shifting means, said servo motor being effective to adjust said phase shifter until the output signal into said amplifier is a minimum and means for observing the other of said rectifier circuit output signals.

8. Unbalance measuring apparatus for measuring the unbalance in a rotating workpiece comprising means having a pair of rectifier circuits, each of said circuits having a first inductive input comprising the primary of a transformer and a second input comprising the primary of a second transformer, drive means for rotating said workpiece, a vibration pickup for creating an unbalance signal indicative of the unbalance in said workpiece, said vibration pickup being interconnected with the pair of first inputs to said rectifier circuits, an alternator driven in synchronism with said workpiece to produce a pair of reference signals ninety degrees out of phase with each other, phase shifting means interconnecting said alternator with the pair of second inputs to said rectifier circuits for actuating each of said circuits to rectify said unbalance signal and produce a pair of output signals, a positioning servo mechanism including a servo amplifier having an input connected to the output of one of said rectifier circuits and responsive to the output signal therefrom and a servo motor having a control winding interconnected with the output of said amplifier, said motor being operatively interconnected with said phase shifting means for adjusting said phase shifting means until said output signal is a minimum, said servo mechanism including a receiver operatively interconnected with said drive means for repositioning said workpiece after said workpiece stops rotating in response to the position of the phase shifter, and means for observing the other of said rectifier circuit output signals.

9. Unbalance measuring apparatus for measuring the unbalance in a rotating workpiece comprising, circuit means having a pair of separate rectifier sections, each of said sections having a first input and a second input, a vibration pickup for creating an unbalance signal indicative of the unbalance in said workpiece, said vibration pickup being interconnected with the pair of first inputs to said rectifier circuits, a two phase alternator driven in synchronism with said workpiece to produce a pair of electrical reference signals ninety degrees out of phase with each other and supplying said signals to the pair of second inputs to said sections, means for shifting the phase of said signals relative to said workpiece, each of said sections being responsive to one of said reference signals to thereby rectify the unbalance signal in that section and thus produce an output signal, a continuous proportional servo positioning system including a servo motor and a servo amplifier having an input connected to the output of one of said sections and responsive to the output signal therefrom, said servo motor having a control winding connected to the output of said amplifier and a rotor mechanically coupled to said adjustable phase shifting means to adjust the phase of the reference signal relative to the vibration pickup signal and reduce said output signal to zero, and means operatively connected to the output of the other of said sections and responsive to the output signal therefrom to indicate the amplitude thereof.

References Cited in the file of this patent

UNITED STATES PATENTS

| | | |
|---|---|---|
| 1,822,075 | Aronoff | Sept. 8, 1931 |
| 2,118,770 | Sivertsen | May 24, 1938 |
| 2,167,488 | Ohlson | July 25, 1939 |
| 2,177,830 | Janeway | Oct. 31, 1939 |
| 2,243,379 | Johnson | May 27, 1941 |
| 2,293,371 | Van Degrift | Aug. 18, 1942 |
| 2,492,092 | Bulliet | Dec. 20, 1949 |
| 2,616,289 | Kleckner | Nov. 4, 1952 |
| 2,636,381 | Hagg et al. | Apr. 28, 1953 |
| 2,678,558 | Pischel | May 18, 1954 |
| 2,695,516 | Petroff | Nov. 30, 1954 |
| 2,731,835 | Haller et al. | Jan. 24, 1956 |
| 2,779,217 | Stovall et al. | Jan. 29, 1957 |
| 2,783,649 | Hope | Mar. 5, 1957 |
| 2,821,858 | King | Feb. 4, 1958 |
| 2,861,455 | Wright | Nov. 25, 1958 |

OTHER REFERENCES

Electronics, December 1943, article: "Strain Gages," by D. M. Nelson, pages 106–111.

Active Networks, by Vincent C. Rideout, page 193. (Copyright April 16, 1954.) Published by Prentice-Hall, New York.